US006587097B1

(12) United States Patent
Aufderheide et al.

(10) Patent No.: US 6,587,097 B1
(45) Date of Patent: Jul. 1, 2003

(54) DISPLAY SYSTEM

(75) Inventors: Brian E. Aufderheide, Cedarburg, WI (US); Joseph C. Spang, Waukesha, WI (US); Louis R. Linsmeyer, Hustisford, WI (US)

(73) Assignee: 3M Innovative Properties Co., St. Paul, MN (US)

( * ) Notice: Subject to any disclaimer, the term of this patent is extended or adjusted under 35 U.S.C. 154(b) by 170 days.

(21) Appl. No.: 09/723,723

(22) Filed: Nov. 28, 2000

(51) Int. Cl.$^7$ .............................. G09G 5/00; G09G 3/36; G01N 27/26
(52) U.S. Cl. ..................... 345/173; 345/173; 345/174; 345/104; 204/403.2
(58) Field of Search .................. 345/104, 173; 607/153; 600/391; 204/220; 338/2; 156/77; 178/18.01–18.11, 19.01–19.07, 20.01–20.04

(56) References Cited

U.S. PATENT DOCUMENTS

| 3,915,548 A | 10/1975 | Opittek et al. |
| 4,017,848 A | 4/1977 | Tannas, Jr. |
| 4,292,461 A | 9/1981 | Hovel |
| 4,342,879 A | 8/1982 | Catalano et al. |
| 4,410,968 A | 10/1983 | Frohbach et al. |
| 4,419,533 A | 12/1983 | Czubatyj et al. |
| 4,422,721 A | 12/1983 | Hahn et al. |
| 4,495,514 A | 1/1985 | Lawrence et al. |
| 4,497,974 A | 2/1985 | Deckman et al. |
| 4,498,225 A | 2/1985 | Gutierrez et al. |
| 4,508,609 A | 4/1985 | Moustakas et al. |
| 4,509,997 A | 4/1985 | Cockayne et al. |
| 4,534,622 A | 8/1985 | Harada et al. |
| 4,543,958 A | * 10/1985 | Cartmell ..................... 156/77 |
| 4,554,727 A | 11/1985 | Deckman et al. |

(List continued on next page.)

FOREIGN PATENT DOCUMENTS

| DE | 196 34 576 C1 | 9/1997 | ............ H04N/5/72 |
| EP | 0 145 201 | 6/1985 | ............ G02B/1/10 |
| EP | 697 646 | 2/1996 | |
| EP | 867 493 | 9/1998 | |
| EP | 1 020 738 A1 | 7/2000 | ............ G02B/1/11 |

(List continued on next page.)

OTHER PUBLICATIONS

International Search Report for International Application No. PCT/US00/32646, having inventor Brian E. Aufderheide, dated "Feb. 27, 2001" (4 Sheets).

(List continued on next page.)

Primary Examiner—Bipin Shalwala
Assistant Examiner—Prabodh Dhria
(74) Attorney, Agent, or Firm—Robert J. Pechman

(57) ABSTRACT

A display system is disclosed. The display system may include a display panel for display of information. The display system may also include a touch screen coupled to the display panel. The touch screen may include a base layer physically coupled to a cover layer. The touch screen may also include a semi-rigid conductor for electrically coupling the base layer to the cover layer. The conductor may be generally dispensable at about room temperature. A touch screen including a semi-rigid conductor for electrically coupling a base to a cover is also disclosed. A touch screen having a first and second means for providing an electrically conductive material is also disclosed. A connector may electrically couple the first means to the second means and may be generally dispensable at about room temperature. A method of manufacturing a touch screen is also disclosed.

30 Claims, 2 Drawing Sheets

U.S. PATENT DOCUMENTS

| | | | |
|---|---|---|---|
| 4,572,958 A | 2/1986 | Durand et al. | |
| 4,585,310 A | 4/1986 | Clecak et al. | |
| 4,587,171 A | 5/1986 | Hamano et al. | |
| 4,591,189 A | 5/1986 | Holmen et al. | |
| 4,598,164 A | 7/1986 | Tiedje et al. | |
| 4,644,221 A | 2/1987 | Gutierrez et al. | |
| 4,653,860 A | 3/1987 | Hendrix | |
| 4,672,014 A | 6/1987 | Joiner et al. | |
| 4,677,250 A | 6/1987 | Barnett et al. | |
| 4,747,674 A | 5/1988 | Butterfield et al. | |
| 4,782,222 A | 11/1988 | Ragle et al. | |
| 4,786,767 A | 11/1988 | Kuhlman | |
| 4,799,770 A | 1/1989 | Kahn et al. | |
| 4,825,081 A | 4/1989 | Willie et al. | |
| 4,838,656 A | 6/1989 | Stoddard | |
| 4,846,551 A | 7/1989 | Rancourt et al. | |
| 4,870,322 A | 9/1989 | Matsudaira et al. | |
| 4,882,183 A | 11/1989 | Ino et al. | |
| 4,899,204 A | 2/1990 | Rosen et al. | |
| 4,940,495 A | 7/1990 | Weber et al. | |
| 4,963,788 A | 10/1990 | King et al. | |
| 4,970,376 A | 11/1990 | Mellor et al. | |
| 4,990,286 A | 2/1991 | Gordon | |
| 5,056,895 A | 10/1991 | Kahn | |
| 5,073,219 A | 12/1991 | McArdle et al. | |
| 5,076,674 A | 12/1991 | Lynam | |
| 5,078,803 A | 1/1992 | Pier et al. | |
| 5,162,783 A | 11/1992 | Moreno | |
| 5,193,668 A | 3/1993 | Fukuchi et al. | |
| 5,218,417 A | 6/1993 | Gay et al. | |
| 5,233,459 A | 8/1993 | Bozler et al. | |
| 5,239,406 A | 8/1993 | Lynam | |
| 5,270,858 A | 12/1993 | Dickey | |
| 5,280,570 A | 1/1994 | Jordan | |
| 5,323,024 A | 6/1994 | Adams | |
| 5,335,098 A | 8/1994 | Leyva et al. | |
| 5,351,255 A | 9/1994 | Schetzina | |
| 5,355,245 A | 10/1994 | Lynam | |
| 5,368,309 A | 11/1994 | Monroe et al. | |
| 5,384,653 A | 1/1995 | Benson et al. | |
| 5,399,978 A | 3/1995 | De Kort et al. | |
| 5,407,733 A | 4/1995 | Bjornard et al. | |
| 5,417,791 A | 5/1995 | Beeteson et al. | |
| 5,421,589 A | 6/1995 | Monroe | |
| 5,421,982 A * | 6/1995 | Ikeda et al. | 204/403.02 |
| 5,428,226 A | 6/1995 | Adams | |
| 5,451,724 A | 9/1995 | Nakazawa et al. | |
| 5,477,088 A | 12/1995 | Rockett et al. | |
| 5,489,369 A | 2/1996 | Bjornard et al. | |
| 5,494,833 A | 2/1996 | Martin et al. | |
| 5,495,833 A | 3/1996 | Ishizaka et al. | |
| 5,508,091 A | 4/1996 | Austin | |
| 5,521,035 A | 5/1996 | Wolk et al. | |
| 5,523,877 A | 6/1996 | Lynam | |
| 5,528,071 A | 6/1996 | Russell et al. | 257/458 |
| 5,530,581 A | 6/1996 | Cogan | 359/265 |
| 5,541,438 A | 7/1996 | Martin et al. | 257/447 |
| 5,541,770 A | 7/1996 | Pellicori et al. | 359/585 |
| 5,578,141 A | 11/1996 | Mori et al. | 136/251 |
| 5,589,008 A | 12/1996 | Keppner | 136/259 |
| 5,591,945 A | 1/1997 | Kent | 178/19 |
| 5,602,397 A | 2/1997 | Pitts et al. | 256/374 |
| 5,605,595 A | 2/1997 | Beeteson et al. | 156/295 |
| 5,620,572 A | 4/1997 | Bjornard et al. | 204/192.12 |
| 5,626,526 A | 5/1997 | Pao et al. | 473/156 |
| 5,639,151 A | 6/1997 | McNelley et al. | 353/98 |
| 5,668,576 A * | 9/1997 | Ikura et al. | 204/403.02 |
| 5,679,043 A | 10/1997 | Kumar | 445/24 |
| 5,680,185 A * | 10/1997 | Kobayashi et al. | 204/220 |
| 5,680,245 A | 10/1997 | Lynam | 359/265 |
| 5,688,389 A | 11/1997 | Bjornard et al. | 204/48.25 |
| 5,729,379 A | 3/1998 | Allemand et al. | 359/270 |
| 5,738,961 A | 4/1998 | Chen | 430/22 |
| 5,742,119 A | 4/1998 | Aben et al. | 313/479 |
| 5,758,956 A | 6/1998 | Bornhorst et al. | 362/294 |
| 5,763,997 A | 6/1998 | Kumar | 313/495 |
| 5,777,390 A | 7/1998 | Berger et al. | 257/749 |
| 5,777,665 A | 7/1998 | McNelley et al. | 348/20 |
| 5,780,916 A | 7/1998 | Berger et al. | 257/471 |
| 5,795,430 A | 8/1998 | Beeteson et al. | 156/350 |
| 5,804,466 A | 9/1998 | Arao et al. | 438/95 |
| 5,812,405 A | 9/1998 | Meredith, Jr. | 364/473.01 |
| 5,818,625 A | 10/1998 | Forgette et al. | 359/267 |
| 5,847,690 A * | 12/1998 | Boie et al. | 345/104 |
| 5,847,876 A | 12/1998 | Ferrante et al. | 359/581 |
| 5,869,129 A | 2/1999 | Aben et al. | 427/64 |
| 5,915,285 A * | 6/1999 | Sommer | 338/2 |
| 5,955,198 A | 9/1999 | Hashimoto et al. | 428/414 |
| 6,020,945 A | 2/2000 | Sawai et al. | 349/119 |
| 6,034,335 A | 3/2000 | Aufderheide et al. | 200/5 A |
| 6,261,700 B1 | 7/2001 | Olson et al. | 428/522 |
| 6,310,611 B1 * | 10/2001 | Caldwell | 178/18.06 |
| 6,418,333 B1 * | 7/2002 | Axelgaard | 600/391 |

FOREIGN PATENT DOCUMENTS

| | | | |
|---|---|---|---|
| JP | 07296672 | 11/1995 | H01H/13/02 |
| JP | 11053114 | 2/1999 | G06F/3/033 |
| JP | 2000029612 | 1/2000 | |
| WO | 93/07844 | 4/1993 | |
| WO | WO 97/08357 | 3/1997 | C23C/14/08 |
| WO | WO 00/63924 | 10/2000 | H01B/5/14 |

OTHER PUBLICATIONS

U.S. patent application Ser. No. 09/611,439, titled "Touch Screen System" as filed Jul. 6, 2000, (including specification, claims and drawings, 24 sheets).

Dynapro Thin Film Products "Application Notes—Working Concepts—Dynnaclear4™ Analog Touch Panel," 1993, 1 page.

Dynapro "TouchSurround," Sep. 1999, 4 pages.

* cited by examiner

DISPLAY SYSTEM

CROSS-REFERENCE TO RELATED APPLICATIONS

The following U.S. Patent Application is hereby incorporated by reference: U.S. patent application Ser. No. 09/611,439 titled "Touch Screen System" filed Jul. 6, 2000.

FIELD

The present invention relates to display system. More specifically, the present invention relates to a touch screen. More particularly, the present invention relates to a connector for electrically coupling layers of a touch screen.

BACKGROUND

A touch screen is generally known. Such touch screen is typically used in front of a computer-driven display that is capable of displaying variable images, or a non-variable display that is capable of providing fixed images. Such touch screen may "sense" or recognize the existence and location of a "touch" on its exterior surface so that a user can input commands to an accessory (e.g., a general purpose computer). A touch screen may be resistive or capacitive, analog or matrix.

In a resistive touch screen, during an input event or "touch" an electrically conductive flexible layer is deformed, bent or pressed across a gap to contact an electrically conductive stable layer. When the flexible layer contacts the stable layer, the touch from an input element or device (e.g., finger or stylus) can be "sensed." When the flexible layer of a matrix touch screen is pressed, a discrete switch is closed and two electrically conductive coatings (e.g., a transparent coating patterned in rows on one surface of the flexible layer and patterned in columns orthogonal to the rows on the opposing surface of the stable layer) are brought into electrical contact. The discrete switch is associated with a particular row and column. A computer or other electronic circuit can be used to provide electric signals to the rows and columns and determine the horizontal and vertical position (X, Y coordinate) associated with the closed discrete switch.

However, a problem with such touch screen is that the material that physically and electrically attaches the flexible layer to the stable layer (i.e., cured epoxy having a conductor) is hard and rigid and may crack or obtain fissures due to temperature and humidity changes. Other disadvantages of such epoxy include: storage of the epoxy at a cold temperature of about −40° C., since such epoxy typically has a pot life or useful life of about six hours at room temperature, which may result in unused or unusable epoxy material; warming of the epoxy before use; curing of the epoxy at a high temperature of about 87° C., which may require curing equipment (e.g., an oven), time (e.g., about one-hundred and twenty minutes), and which may affect other materials of the touch screen (e.g., shrinkage/expansion of the stable and flex layers).

Accordingly, there is a need for a touch screen conductor to couple the flexible layer to the stable layer that may be stored at ambient temperature. There is also a need for a touch screen fastener that may be semi-rigid. There is also a need for a low cost connector that may be easily applied in a touch screen application. There is also a need for a touch screen connector that may be applied at room temperature. Thus, it would be advantageous to provide a touch screen having features that fulfill one or more of these needs. These and other features will become apparent to one of skill who reviews this disclosure and appended claims.

SUMMARY

The present invention relates to a display system. The display system may include a display panel for display of information. The display system may also include a touch screen coupled to the display panel. The touch screen may include a base layer physically coupled to a cover layer. The touch screen may also include a semi-rigid conductor for electrically coupling the base layer to the cover layer. The conductor may be generally dispensable at about room temperature.

The present invention also relates to a touch screen including a semi-rigid conductor for electrically coupling a base to a cover.

The present invention also relates to a touch screen. The touch screen may include a first means for providing an electrically conductive material. The touch screen may also include a second means for providing an electrically conductive material. The touch screen may also include a connector for electrically coupling the first means to the second means. The connector may be generally dispensable at about room temperature.

The present invention also relates to a method of manufacturing a touch screen. The method may include providing a first layer having a first relatively translucent surface. The method may also include providing a second layer having a second relatively translucent surface. The method may also include dispensing a conductor on at least one of the first surface and the second surface thereby electrically coupling the first surface to the second surface. The conductor may have a viscosity of at least about 5,000 centipoise at 0.3 RPM at about room temperature. The conductor may also have flexibility sufficient to compensate at least partially for relative movement of the first layer and the second layer due to environmental changes.

DETAILED DESCRIPTION OF PREFERRED AND OTHER EXEMPLARY EMBODIMENTS

Figure 1:
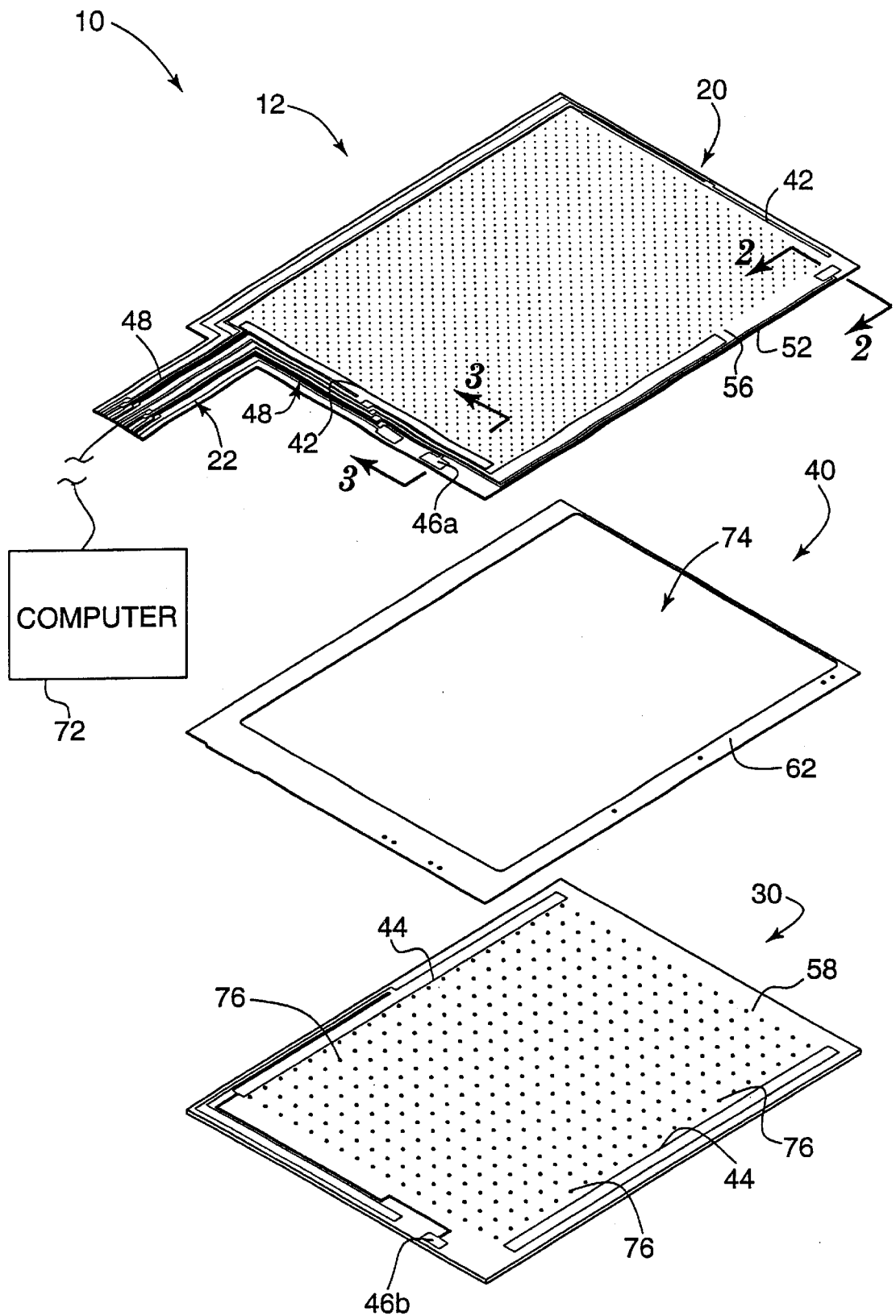
FIG. 1 is an exploded perspective view of a touch screen according to an exemplary embodiment.
Figure 4:
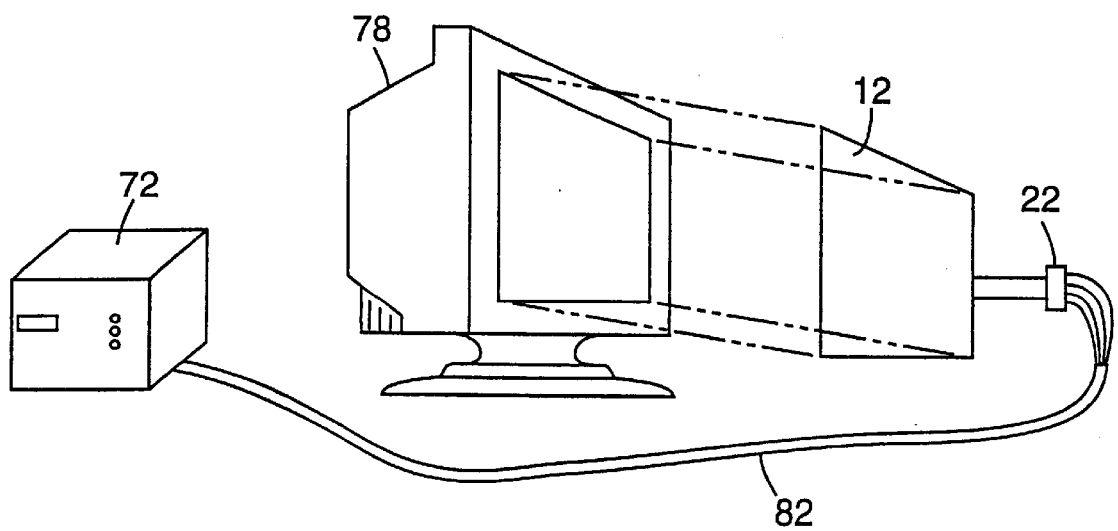
FIG. 4 for is a partially exploded perspective view of a display system including the touch screen shown in FIG. 1.

A display system 10 having a touch sensor or touch screen 12 is shown in FIG. 1. Touch screen 12 may be mounted to a display panel (shown as a monitor 78) on which media or indicia (e.g., text and images) may be displayed (see FIG. 4). Touch screen 12 may be relatively transparent for viewing of media generated by monitor 78. A circuit or wire 82 may electrically attach touch screen 12 (and monitor 78) to an accessory (shown as a special purpose personal desktop computer 72). A user may input or transmit information or data to computer 72 by pressing or touching touch screen 12.

As shown in FIG. 1, touch screen 12 may have a "sandwiched" or layered construction. Touch screen 12 includes a flexible or deformable cover sheet or user interface floating layer (shown as a flex layer 20). An adhesive layer or spacer 40 attaches flex 20 to an opposing base substrate or backing panel sheet (shown as a stable layer 30). Flex 20 is separated from stable 30 by an air gap 66 (see FIG. 3). Gap 66 assists in insulating flex 20 from stable 30.

Figure 2:
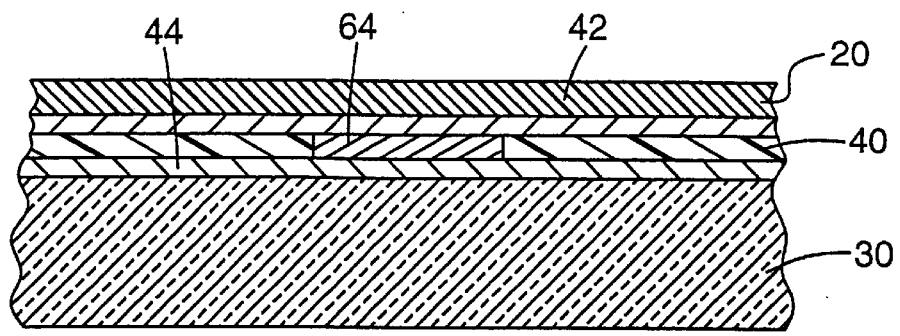
FIG. 2 is a fragmentary cross-sectional view of the touch screen shown in FIG. 1 along line 2—2.

An electrically conductive region (shown as a vertical bus bar 42 and a horizontal bus bar 44) may be attached (e.g., coated or printed) on flex 20 and stable 30. An electrical conductor or fastener (shown as a connector 64 in FIG. 2) may physically and electrically couple bus bar 42 to bus bar 44. The flex layer and the stable layer may also be electrically connected by a conductive coating and/or a conductive ink on either or both of the flex layer and the stable layer.

The connector may include a carrier and an electrically conductive material or conductor. The carrier may be materials such as a lubricant, grease or relatively non-polar aliphatic hydrocarbon such as a petroleum based oil (e.g., mineral oil, wax, etc.), synthetic oil (e.g., silicone, silicone oil, etc.) or natural oil (e.g., canola oil). The conductive material may assist in conducting electricity through the connector. According to alternative embodiments, the conductive material may be a relatively conductive conductor such as gold, platinum, silver, palladium, or a relatively inexpensive conductor such as carbon or graphite, silver powder, nickel, etc. According to a preferred embodiment, the conductive material is a silver flake. According to another alternative embodiment, the conductive material may be a sphere of a relatively non-conductive material (e.g., glass, plastic, etc.) coated with a conductive material. The conductive material may be present in a ratio of about 80% conductive material to 20% carrier (by volume) according to a suitable embodiment.

According to a particularly preferred embodiment, the connector may be a non-migrating lubricating conductive thermal grease such as model number 8501 non-curing electrogrease paste commercially available from AI Technology, Incorporated of Princeton Junction, N.J. Such electrogrease is traditionally used for thermal and electrical transfer for power devices, and is typically dispensed in large quantities with a spatula from a jar or container. Such electrogrease has a thermal conductivity of greater than about 6 Watt/m-° C., and an electrical resistivity of less than about 0.005 ohm-cm. According to an alternative embodiment, the connector may be the single part (e.g., part "A" of a conductive epoxy, silver filled bisphenol A epichlorohydrin type epoxy resin) of a two part epoxy (e.g., curing agent, the part "B" of the epoxy, amine or a polyamide). According to another alternative embodiment, the connector may be the single part of a silver filled, thermosetting conductive epoxy.

Flex 20 and stable 30 may be made of different materials. For example, the stable layer may be made of soda lime glass and the flex layer may be made of polyester (PET) film. The different materials of the flex layer and the stable layer may have different coefficients of expansion (e.g., thermal expansion, hygroscopic expansion, etc.), and accordingly may expand or contract by different amounts (and at different rates) at various temperatures and humidities. Some exemplary coefficients of expansion for certain materials that could be used in a touch screen are shown in TABLE 1.

TABLE 1

Coefficients of Expansion

| | Thermal Expansion (in/in/° C.) | Hygroscopic Expansion (in/in/%RH) |
|---|---|---|
| Soda Lime Glass | $9 \times 10^{-6}$ | less than $1 \times 10^{-6}$ |
| Acrylic Sheet | 75 to $162 \times 10^{-6}$ | $21 \times 10^{-6}$ |
| PET polyester film | $23 \times 10^{-6}$ (machine direction) $18 \times 10^{-6}$ (cross direction) | $12 \times 10^{-6}$ (machine direction) $11 \times 10^{-6}$ (cross direction) |
| Polycarbonate film | $67.5 \times 10^{-6}$ | $10 \times 10^{-6}$ |

The connector may be generally semi-rigid (e.g., relatively soft, deformable, malleable, flexible, bendable, etc.). The rigidity of the connector could compensate (e.g., maintain an electrical connection or electrical integrity) for changes (e.g., movements, expansion, contraction, etc.) of the flex layer and the stable layer due to environmental factors (e.g., temperature or humidity changes). Such changes could be caused by environmental factors during shipping or use of the touch screen. A suitable connector would not necessarily break or crack due to such changes. Rather a suitable connector could absorb such changes as the flex and the stable move relative to each other. The connector may be somewhat more "solid" than a liquid at room temperature and less hard than a fully cured epoxy, which would likely be "crushed" under significant pressure or "cracked" during relatively extreme expansion changes in the flex layer and the stable layer of the touch screen.

The connector may be soft enough to apply or dispense at about room temperature or greater. According to a suitable embodiment, the connector may be spread as a paste or injected from a syringe. Such dispensing methods may facilitate manufacturing of the touch screen (e.g., by automation) because relatively cold temperatures (e.g., −40° C.) are not necessarily required for stability of the connector. According to a suitable embodiment, the connector could remain relatively soft (e.g., semi-rigid) during and after application, such that the connector could be readily wiped from the flex or the stable at various temperatures (e.g., room temperature and above). Such retention of softness could provide increased manufacturing efficiencies, since the connector does not necessarily need to be stored at an extremely low temperature (e.g., −40° C.) and will not necessarily change viscosity as it is heated (e.g., from −40° C. to room temperature to 87° C.). According to other alternative embodiments, heating and/or light may cure the connector (e.g., UV cured). According to another alternative embodiment, the connector may be applied at a relatively high temperature (e.g., above room temperature) and gain or increase rigidity as it is cooled to room temperature (similar to a hot melt adhesive).

The connector may be relatively viscous. The connector may have a viscosity that is low enough to dispense from a syringe (e.g., 5 cc or 10 cc volume), and that is high enough to dispense from an open container with a spatula. At room temperature, according to a suitable embodiment, the viscosity of the connector may be high enough to not substantially flow or be "pourable." Such relatively high viscosity could aid in keeping the flex in a relatively constant force or contact with the stable during use and storage of the touch screen. The viscosity of the connector need not necessarily change substantially with changing temperature (e.g., compared to the change in viscosity of an epoxy from −40° C. to 87° C.). The connector (e.g., hot melt adhesive) may have some "tackiness" or tackability, due at least in part to its relatively high viscosity. Thus, the connector could serve as a primary or supplemental/auxiliary fastener or adhesive and provide at least some bonding strength for physically connecting or bonding the flex to the stable.

According to a suitable embodiment, the connector may have a viscosity greater than the viscosity of a pourable liquid (e.g., maple syrup) and less than the viscosity of a rigid mixture (e.g., cold or set asphalt). According to a suitable embodiment, the connector has a viscosity of about 5,000–4,000,000 centipoise at 0.3 RPM "shear rate" using a model number HBDV-II cone and plate viscometer with a CPE-51 spindle (commercially available from Brookfield Engineering Laboratories, Inc. of Middleboro, Mass.). According to another suitable embodiment, the connector may have a viscosity of about 100,000–400,000 centipoise at 0.5 RPM, more suitably about 200,000–300,000 centipoise at 0.5 RPM.

The connector may have a relatively high conductivity such that it may be capable of conducting electricity from flex 20 to stable 30 by electrically connecting bus bar 42 to bus bar 44. The resistivity of the connector may be relatively low (e.g., lower than the resistivity of the bus bars or the conductive coating or conductive ink). According to a preferred embodiment, the resistivity of the connector is relatively stable such that the voltage differential of the touch screen need not be recalibrated due to substantial fluctuations in the resistivity of the connector. According to a suitable embodiment, the resistivity of the connector is less than about 1 ohm-cm, suitably less than about 0.015 ohm-cm, suitably less than about 0.006 ohm-cm.

The flex and the stable may be relatively clear or translucent. As used in this disclosure, the term "translucent" includes allowing at least some or all light to pass. A translucent material includes all materials that are transparent and/or non-opaque. The flex may be relatively thin, and may have a thickness of about 0.005–0.028 inch in thickness. The stable may have a thickness of about 0.01–0.25 inch according to a suitable embodiment. The flex and the stable may be made of a relatively non-conductive material (e.g., plastic, polyester, polyethylene terephthalate or PET, etc.). The material of the flex and the stable may include glass (e.g., soda lime glass that may be chemically strengthened or tempered), polyester, polycarbonate, acrylic, etc. The flex and the stable may be provided with a decorative surface treatment (e.g., decorative covering, coating, paint, thin film, surface indicia, graphics display, colors, patterns, etc.) in a wide variety of combinations (i.e., with one area differing in whole or in part from another area of the layer). The flex and the stable may also be suited or adapted to provide a wide variety of functional surface treatments (e.g., communicating information, a printed graphic, optical filter, electromagnetic shield, electrostatic shield, electromagnetic interference or EMI shield, electrostatic discharge or ESD shield, electromagnetic pulse or EMP shield, etc.) according to alternative embodiments.

A variety of coatings may be applied to the flex and/or the stable. For example, the outer surface of the flex (e.g., the surface that an end user may touch) may be covered with a relatively hard coating such as an UV cured acrylate. The hard coating may serve to decrease reflected glare and to reduce the visibility of debris (e.g., fingerprints). The hard coating may have a roughened surface, which may be produced by filler material such as silica particles or by etching. According to a suitable embodiment, the hard coating may have a thickness of about 0.0001–0.0015 inch.

A relatively non-conductive coating may be applied to the interior facing surfaces of the flex and the stable (shown as an interior surface 52 of flex 20 and an interior surface 54 of stable 30 shown in FIG. 1). The non-conductive coating may be "textured." The textured coating may include an acrylic or other clear polymer coating filled with glass or plastic spheres (e.g., anti-Newton Ring coating). Such textured coating may assist in preventing "Newton Rings" (i.e., Newton Rings may result when light rays reflecting off of the flex or the stable optically interfere with the information intended to be displayed on the touch screen). According to an alternative embodiment, the interior surfaces can include multiple layers (e.g., single, dual, triple, etc.) of an anti-reflective coating.

A relatively conductive, transparent coating may be applied to the interior facing surfaces of the flex and the stable. The conductive coating may include indium tin oxide or ITO (see an ITO layer 56 on surface 52 of flex 20 and an ITO layer 58 on interior surface 54 of stable 30 shown in FIG. 1). The conductive coatings have generally uniform sheet resistivity. According to a suitable embodiment, the conductive coating may have a resistivity of about 60–1000 ohms/square, more suitably about 200–650 ohms/square. According to another suitable embodiment, the conductive coating may have a thickness of about 10–100 nm. The pattern of both the conductive coating and the conductive ink may depend in part on the type of touch screen (e.g., resistive, matrix, etc.) and design parameters, such as size of end user display, etc. According to an alternative embodiment, the conductive coating may include a tin antimony oxide coating, a zinc oxide coating, or other appropriate conductive sheet.

Bus bars 42 and 44 can be silver ink having a conductivity of about 1000 times more than the conductivity of the translucent coatings on surfaces 52 and 54. Referring to FIG. 1, a connection surface 46a is shown electrically connected to and extending from bus bar 42 of flex 20. An electrical circuit (shown in FIG. 1 as an eight lead circuit 48 made of silver conductive ink) may also be electrically coupled to bus bar 42 of flex 20. The electrical circuit may terminate in a flexible adapter or outlet (shown as a tail 22) integral and continuous with flex 20. Tail 22 may be electrically connected to an accessory such as external decoding circuitry, a general purpose computer, monitor, controller, PLC, user interface, cathode ray tube (CRTs), liquid crystal display (LCDs), plasma display, EL displays, control panel, "pocket" or handheld organizer, PDA, arcade game, any electronic device requiring human interaction, etc. (and shown as computer 72 in FIG. 4). Electricity may flow from connection surface 46a, through connector 64 to a connection surface 46b shown electrically connected to and extending from the edge of stable 30. According to an alternative embodiment, the connection surface may be integral with the stable. According to another alternative embodiment, the touch screen may include a membrane switch to complete an electrical circuit such that when a user depresses a top layer of the membrane to make a physical and electrical contact with a bottom layer of the membrane.

Referring to FIG. 1, spacer 40 is shown having a generally rectangular shape with a central aperture 74. Spacer may hold flex 20 to stable 30 alone or in combination with an auxiliary fastener or adhesive. Spacer 40 may also assist in ensuring that gap 66 or other relatively non-conductive medium separates the conductive coatings when flex 20 is not touched or depressed. As shown in FIG. 1, spacer 40 may be adhered to only the perimeter or periphery of flex 20 and stable 30, leaving open the center of spacer 40 so that flex 20 can make contact with stable 30 when pressure is applied to flex 20. Spacer 40 may be applied on one or both of flex 20 and stable 30. Spacer 40 may include a register or hole 62 for insertion of connector 64.

According to a suitable embodiment, the spacer may be an acrylic pressure sensitive adhesive ("PSA"). According to another suitable embodiment, the spacer may be a screen-printed, ultra-violet light cured acrylate adhesive. According to another suitable embodiment, the spacer may be a silicone or silicone-based pressure sensitive adhesive laminate or coating of the type described in U.S. patent application Ser. No. 09/611,439 titled "Touch Screen System" filed Jul. 6, 2000, the disclosure of which is hereby incorporated by reference. According to a suitable embodiment, the spacer may be about 0.0005–0.010 inch thick, suitably about 0.001–0.005 inch, suitably about 0.003 inches. According to an alternative embodiment, the spacer may include a protective cover (e.g., paper, plastic, release liner, etc.). According to another alternative embodiment, a relatively thin layer such as a 0.001 inch thick polyester layer may at least partially support the spacer adhesive.

Figure 3:
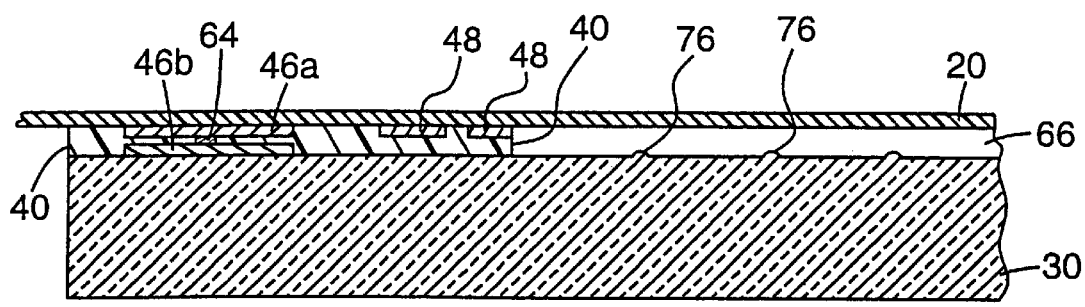
FIG. 3 is a fragmentary cross-sectional view of the touch screen shown in FIG. 1 along line 3—3.

According to an alternative embodiment as shown in FIG. 3, a supplemental spacer shown as a spacer protrusion or dot 76 may provide spacing or distancing of the flex and the stable. Dot 76 may be made from an insulating material (e.g., UV cured acrylate, ink material, etc.). The spacer dot may assist in inhibiting the flex from contacting or touching the stable when the flex is not touched or pressed. The spacer dot may be about 0.001–0.016 inch in diameter, about 0.0001–0.0016 inch high, and arranged in a regular pattern according to a suitable embodiment. The density of the pattern, the height of the dot and other factors may control in part the force necessary to actuate the touch screen.

The touch screen may be fabricated by coating (or printing) patterned ITO on a roll (e.g., for the stable and the flex) and printing the conductive bus bars on the roll. The conductive coating may be deposited by a "sputtering" technique (e.g., coated in a vacuum deposition process such as DC magnetron sputtering) or may be applied by any other method (e.g., evaporation, chemical vapor deposition, etc.) known to one of skill who reviews this disclosure. The roll may then be cut into separate sheets. The spacer adhesive may be cut from pre-coated rolls or sheets of adhesive with a release liner on both sides. The PSA sheets may be stack cut to the appropriate size and die cut with a steel rule die. (According to an alternative embodiment, the insulator and the spacer dots may be printed on the sheets, and the spacer adhesive may be printed on the sheets.) After the adhesive associated with the spacer is applied to at least one of the flex or the stable, a release liner can be provided over the adhesive to protect it from dirt and debris and for later attachment.

According to a particularly preferred embodiment, about 2.5 cc of an electrogrease (e.g., connector) may be placed in a 10 cc syringe. (The connector may be stored at about room temperature and may be applied or dispensed at about room temperature.) The electrogrease may be dispensed at about room temperature through an 18 gauge tip of the syringe with about 10–90 psi of air pressure using a 1000XL varimeter commercially available from EFD, Incorporated of East Providence, R.I. (According to an alternative embodiment, the electrogrease may be dispensed using a SV100 Servo Valve dispenser commercially available from Precision Valve & Automation, Inc., of Halfmoon, N.Y.) Adjusting either the air pressure or the amount of time the dispenser is activated may dispense a controlled amount of the electrogrease. According to a suitable embodiment, a volume of about $2 \times 10^{-5}$ cubic inches of the electrogrease may be dispensed or inserted into a well or hole of the spacer adhesive. Any electrogrease than is not dispensed may be returned to a storage container (e.g., at room temperature) or recycled. (According to a suitable embodiment, it may not be necessary for the electrogrease to warm, cure or reach a decreased viscosity during or after application.) The layers are then temporarily aligned or "registered" together on the mounting structure. The individual pieces may be built on a building structure, such as mounting or alignment pins, along with any attachments necessary for registration of the layers during assembly. The release liner may then be removed, and the flex and the stable may be pressed or forced together to assemble the unitary touch screen. Any registration aid or mounting structure may be subsequently removed. The touch screen manufacturing process may be performed in steps, or automated in a relatively short period (e.g., less than about one minute) in a continuous cycle.

According to a particularly preferred embodiment, the touch screen is a DYNACLEAR® 4-wire or 8-wire analog resistive touch panel computer commercially available from 3M Dynapro of Milwaukee, Wis. According to a particularly preferred embodiment, the connector (e.g., electrogrease) may be applied as a spot of 0.093 inch diameter in the spacer.

It is important to note that the construction and arrangement of the elements of the display system in the preferred and other exemplary embodiments is illustrative only. Although only a few embodiments of the present invention have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter at recited in the claims. For example, according to an alternative embodiment an insulating layer may be applied over the conductive bus bars to assist in ensuring that the conductive coatings are electrically separated when the screen is not being touched. The insulator may be a UV curved acrylate, thermally cured epoxy or other similar material that is both electrically insulating, compatible with ITO and adheres to ITO and conductive inks. According to other alternative embodiments, separate layers of PET to carry hard coat and ITO/silver circuitry (the layers laminated with an optical adhesive), including printed graphics, optical filters, and electromagnetic or electrostatic, shields, etc., in the construction of the flex may be used. The stable may be flat, curved, contoured, etc. The stable may include an accessory such as an EMI or ESD shield, gasket, graphic filter, optical filter, etc. The touch screen may be "sealed" or pressurized to inhibit the loss of air from the gap between the flex and the stable. The touch screen may be an analog or matrix touch screen, in which the conductive coating on the flex and the stable may be a uniformly resistive area for analog voltage measurement or be patterned according to columns, rows or other arrangement to form a discrete switch. The physical properties (e.g., rigidity, flexibility, viscosity, hardness, etc.) of the connector may remain relatively uncharged throughout the life of the touch screen (e.g., 1–100 years, suitably 1–20 years, suitably 3–10 years). Accordingly, all such modifications are intended to be included within the scope of the present invention as defined in the appended claims. Other substitutions, modifications, changes and omissions may be made in the design, operating conditions and arrangement of the preferred and other exemplary embodiments without departing from the spirit of the present invention as expressed in the appended claims.

What is claimed is:

1. A touch screen comprising:
a relatively stable base layer comprising a first electrically conductive coating;
a relatively flexible cover layer comprising a second electrically conductive coating;
a spacer mechanically coupling the base layer to the cover layer;
a conductor comprising a grease at least partially in the spacer and configured for mechanically and electrically coupling the base to the cover in a facing relationship;
wherein the conductor is semi-rigid to compensate for expansion of at least one of the cover layer and the base layer.

2. The touch screen of claim 1 wherein the spacer comprises an adhesive.

3. The touch screen of claim 1 wherein the conductor is deformable at about room temperature.

4. The touch screen of claim 3 wherein the conductor is generally flexible.

5. The touch screen of claim 4 wherein the conductor maintains an electrical connection between the base and the cover during at least one of thermal expansion and hygroscopic expansion of at least one of the cover and the base.

6. The touch screen of claim 5 wherein the conductor has a viscosity greater than about 5,000 centipoise at 0.3 RPM at about room temperature.

7. The touch screen of claim 5 wherein the conductor has a viscosity in the range of about 100,000–400,000 centipoise at 0.5 RPM at about room temperature.

8. The touch screen of claim 5 wherein the conductor is substantially free of epoxy.

9. The touch screen of claim 5 wherein the conductor is relatively soft from about minus 40 degrees Celsius to about 87 degrees Celsius.

10. The touch screen of claim 8 wherein the conductor comprises a carrier and a conductive material.

11. The touch screen of claim 10 wherein the carrier comprises a grease.

12. The touch screen of claim 11 wherein the carrier comprises a mineral oil.

13. The touch screen of claim 11 wherein the conductive material comprises at least one of carbon, silver, gold, platinum, palladium, nickel, and combinations thereof.

14. The touch screen of claim 11 wherein the base and the cover are electrically coupled to an accessory.

15. The touch screen of claim 14 wherein the accessory is a computer.

16. A touch screen comprising:
a first means for providing an electrically conductive material comprising:
a relatively stable base layer; and
a first electrically conductive coating;
a second means for providing a second electrically conductive coating in a facing relationship to the first electrically conductive coating and comprising a relatively flexible cover layer;
a connector for electrically coupling the first means to the second means;
wherein the connector comprises a grease that is deformable and configured to compensate for thermal expansion of at least one of the first means and the second means.

17. The touch screen of claim 16 wherein the connector at least partially compensates for at least one of expansion and contraction of the first means relative to the second means due to at least one of temperature and humidity.

18. The touch screen of claim 17 wherein the connector has a viscosity of greater than about 5,000 centipoise at 0.3 RPM at about room temperature.

19. The touch screen of claim 17 wherein the conductor is substantially free of epoxy.

20. A method of manufacturing a touch screen comprising:
providing a first layer having a first relatively translucent surface;
providing a second layer having a second relatively translucent surface;
dispensing a conductor on at least one of the first surface and the second surface thereby electrically coupling the first surface to the second surface;
wherein the conductor has a viscosity of at least about 5,000 centipoise at 0.3 RPM at about room temperature and the conductor has a rigidity sufficient to at least partially compensate for expansion of at least one of the first layer relative to the second layer.

21. The method of claim 20 wherein dispensing the conductor further comprises dispensing the conductor at about room temperature.

22. The method of claim 21 further comprising dispensing the conductor with a syringe.

23. The method of claim 22 comprising applying a pressure sensitive adhesive on at least one of the first surface and the second surface and further comprising coupling the first surface to the second surface.

24. A display system comprising:
a base layer physically coupled to a cover layer by a spacer;
a semi-rigid conductor comprising a grease at least partially in the spacer and configured to electrically couple the base layer to the cover layer;
wherein the conductor has a viscosity of at least about 6,000 centipoise at 0.3 RPM at about room temperature and the conductor has a rigidity sufficient to at least partially compensate for expansion of the cover layer and the base layer.

25. The touch screen of claim 24 wherein the conductor has a viscosity of greater than about 5,000 centipoise at 0.3 RPM at about room temperature.

26. The display system of claim 24 wherein the spacer comprises an adhesive.

27. The display system of claim 26 further comprising a display panel for the display of information.

28. The display system of claim 27 further comprising a touch screen coupled to the display panel.

29. The display system of claim 28 wherein the display panel is a monitor.

30. The display system of claim 29 further comprising a computing device electrically coupled to at least one of the display panel and the touch screen.

* * * * *

UNITED STATES PATENT AND TRADEMARK OFFICE
CERTIFICATE OF CORRECTION

PATENT NO.   : 6,587,097 B1
DATED        : July 1, 2003
INVENTOR(S)  : Aufderheide, Brian E.

It is certified that error appears in the above-identified patent and that said Letters Patent is hereby corrected as shown below:

<u>Column 8,</u>
Line 36, delete the word "at" after "matter"

Signed and Sealed this

First Day of June, 2004

JON W. DUDAS
*Acting Director of the United States Patent and Trademark Office*